US007011210B2

(12) United States Patent
Morita

(10) Patent No.: US 7,011,210 B2
(45) Date of Patent: Mar. 14, 2006

(54) MAGNETIC TAPE CASSETTE CASE

(75) Inventor: Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 36 days.

(21) Appl. No.: 10/122,335

(22) Filed: Apr. 16, 2002

(65) Prior Publication Data

US 2002/0148747 A1 Oct. 17, 2002

(30) Foreign Application Priority Data

Apr. 17, 2001 (JP) .......................... P.2001-118280

(51) Int. Cl.
*B65D 85/575* (2006.01)

(52) U.S. Cl. ............................... 206/307.1; 206/387.1; 206/387.13

(58) Field of Classification Search ............. 206/307.1, 206/387.1, 387.13, 472; 220/835, 834, 833
See application file for complete search history.

(56) References Cited

U.S. PATENT DOCUMENTS 3,542,235 A * 11/1970 Hidding ................... 220/254.2
3,612,709 A * 10/1971 Miyamoto ..................... 402/2
4,809,875 A * 3/1989 Takano ....................... 220/835
4,919,259 A * 4/1990 Beaulieu .................... 206/45.2
5,962,623 A * 10/1999 Eckardt et al. ............. 528/232
6,443,304 B1 * 9/2002 Shiga et al. ............. 206/387.1
6,640,972 B1 11/2003 Morita

FOREIGN PATENT DOCUMENTS

| | | |
|---|---|---|
| JP | 10-188520 | 7/1998 |
| JP | 2000-168877 | 6/2000 |
| JP | 2001-23337 | 1/2001 |
| WO | WO 00/29307 | 5/2000 |

* cited by examiner

*Primary Examiner*—David T. Fidei
(74) *Attorney, Agent, or Firm*—Sughrue Mion, PLLC

(57) ABSTRACT

In a magnetic tape cassette case including an accommodating portion, a lid portion and a connecting portion for connecting the accommodating portion and the lid portion. The case has movement preventing member capable of accommodating magnetic tape cassettes having different sizes for preventing a small one of the magnetic tape cassette from moving in the case, is provided at least at any one of the accommodating portion, the lid portion and the connecting portion. Accordingly, it is possible to provide a magnetic tape cassette case capable of accommodating magnetic tape cassettes having different sizes without play.

4 Claims, 2 Drawing Sheets

MAGNETIC TAPE CASSETTE CASE

BACKGROUND OF THE INVENTION

The present invention relates to a magnetic tape cassette case for accommodating a magnetic tape cassette.

Conventionally, there has frequently been used a magnetic tape cassette as a record medium. In a computer or the like, for use of backup or the like for recorded data, there is used a constitution in which a single tape reel wound with a magnetic tape is pivotably held at inside of a cassette case (one reel type).

The magnetic tape cassette is carried out and stored by being put into an accommodating case in order to protect the magnetic tape cassette against dust, impact in dropping or the like. There also is the case in which a bar code or the like is provided at an accommodating case. The content of information recorded to the magnetic tape cassette at inside of the accommodating case can be referred by way of the bar code or the like.

There is a magnetic tape cassette of the one reel type referred to as DLT™ cassette as shown in Japanese Patent Laid-Open No. 188520/1998.

Further, there has been used a cassette of a type as shown in Japanese Patent Laid-Open No. 2001-23337, in which although an outer shape thereof is substantially the same as that of the above-described DLT cassette, a specification thereof differs therefrom.

Generally, the latter is referred to as Linear-Tape Open (LTO) cassette.

Outer shape dimensions of the DLT cassette and the LTO cassette slightly differ from each other. There is requested a magnetic tape cassette case capable of accommodating the both without play.

SUMMARY OF THE-INVENTION

The invention has been carried out in view of such a situation and it is an object thereof to provide a magnetic tape cassette case capable of compatibly accommodating a plurality of magnetic tape cassettes having different sizes without play.

The above-described object of the invention can be achieved by a magnetic tape cassette case capable of compatibly accommodating a plurality of magnetic tape cassettes having different sizes. The case comprises an accommodating portion, a lid portion and a connecting portion for connecting the accommodating portion and the lid portion. The case also includes movement preventing member that is provided at least one of the accommodating portion, the lid portion and the connecting portion for preventing a small one of the magnetic tape cassettes from moving at inside of the case.

In addition, the above-described object of the invention can also be achieved by a magnetic tape cassette case capable of compatibly accommodating a first magnetic tape cassette and a second magnetic tape cassette smaller in size than the first magnetic tape cassette. The case includes an accommodating portion, a lid portion, a connecting portion for connecting the accommodating portion and the lid portion, and a rib member provided at least one of the accommodating portion, the lid portion and the connecting portion. The rib member is located at position where the rib member is not brought in engagement with an outer surface of the first magnetic tape cassette when the first magnetic tape cassette is accommodated in the case and also where the rib member is brought in engagement with an outer surface of the second magnetic tape cassette when the second magnetic tape cassette is accommodated in the case.

In the above-mentioned magnetic tape cassette case according to the present invention, it is advantageous to further include a protrusion provided at least one of the accommodating portion, the lid portion and the connecting portion, wherein the protrusion is located at position where the rib member is entered into a recess provided on the first magnetic tape cassette when the first magnetic tape cassette is accommodated in the case and also where the protrusion is entered into a recess provided on the second magnetic tape cassette when the second magnetic tape cassette is accommodated in the case.

With the above-mentioned magnetic tape cassette case according to the present invention, a large magnetic tape cassette and also a small magnetic tape cassette can be contained without play. A user is capable of arbitrarily accommodating the large magnetic tape cassette as well as the small magnetic tape cassette inside of the case which allows for efficiencies in use of the cassette case. This also allows for standardizing the size of the cassette case, thereby facilitating handling of the case by a transfer mechanism such as a robot or the like. In addition, when a user has a large-sized library system using both DLT™ and LTO configurations, the sizes for these cases often differ from each other, hampering storage or access of the cases. Further, having different sized cases may require an added burden of preparing special tools or containers for transport of the cases. The present invention resolves these deficiencies associated with related art cases.

The movement preventing member according to the present invention can be exemplified as a movement preventing member or means capable of widening or narrowing an accommodating space partitioned by the accommodating portion, the lid portion and the connecting portion. Further, there can be exemplified a support piece or the like which is brought into contact with a wall face of a small magnetic tape cassette and is not brought into contact with a wall face of a large magnetic tape cassette. Accordingly, the movement preventing feature of the present invention is not limited.

DETAILED DESCRIPTION OF THE PREFERRED EMBODIMENTS

Figure 1:
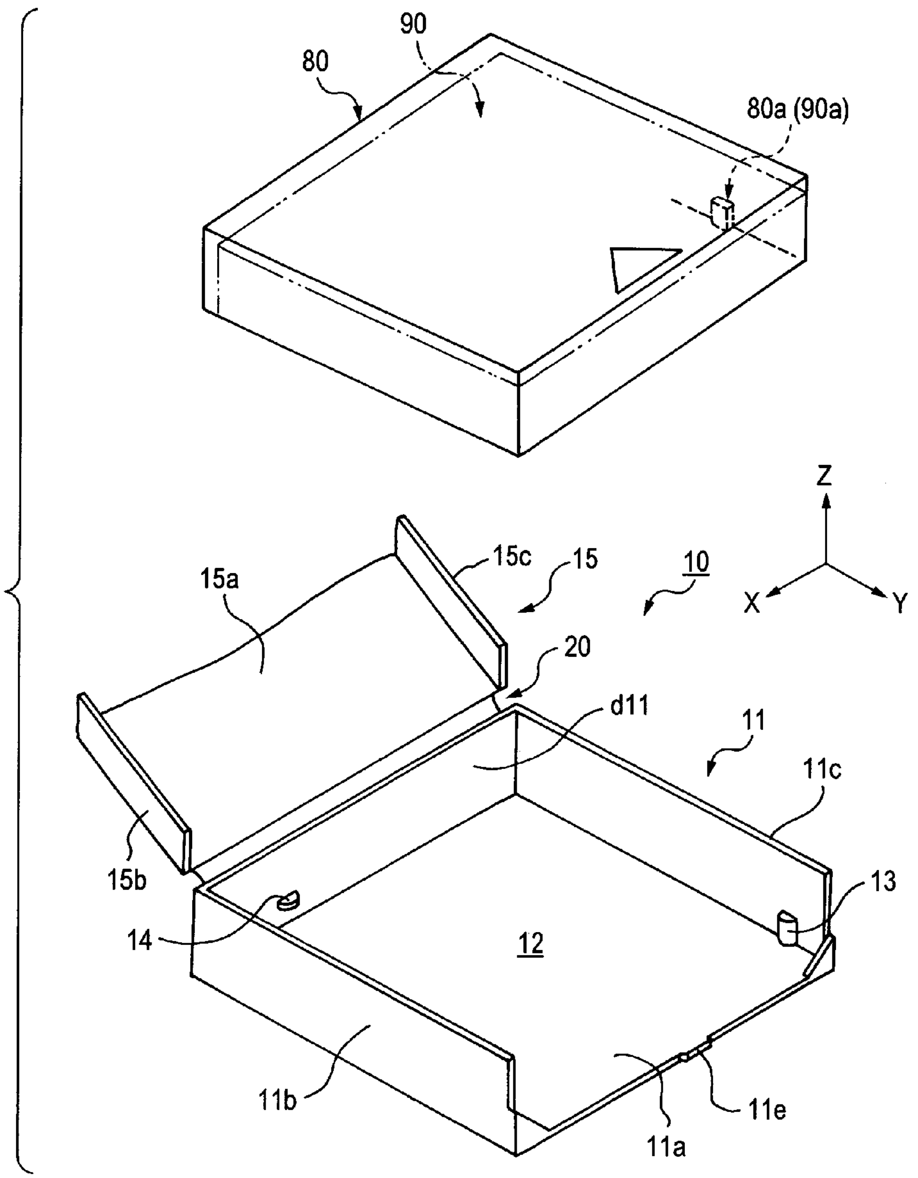
FIG. 1 is a perspective view showing a first embodiment of the invention.

A detailed explanation will be given of an embodiment of the invention in reference to the drawings as follows. A magnetic tape cassette case 10 according to a first embodiment shown in FIG. 1, is capable of accommodating magnetic tape cassettes having at least two kinds of sizes. The accommodating case 10 is capable of accommodating a DLT cassette 80 constituting a large cassette shown by bold lines in the drawing and an LTO cassette 90 constituting a small cassette shown by two-dotted chain lines in the drawing.

A height dimension of the LTO cassette 90 is smaller than that of the DLT cassette 80. Further, the LTO cassette 90 is smaller than the DLT cassette 80 in a dimension thereof in a direction of inserting the cassette. The DLT cassette 80 and the LTO cassette 90 are formed with recessed portions at the same position when reference faces are constituted by predetermined faces. In this case, recessed portions 80*a* and 90*a* are formed at the same position of side faces thereof when reference faces thereof are constituted by bottom faces and rear end faces of the cassettes in inserting the cassettes. The recessed portions 80*a* and 90*a* are inserted with positioning means of a hardware apparatus or the like.

The accommodating case 10 is provided with a accommodating portion 11 having an opening 12 capable of bringing in and out the magnetic tape cassettes 80 and 90 and a lid portion 15 connected to the accommodating portion 11 foldably by way of a connecting portion 20.

The accommodating portion 11 is provided with a bottom wall 11*a* substantially in a rectangular shape (substantially in a square shape), a pair of side walls 11*b* and 11*c* erected at sides of the bottom wall 11*a* opposed to each other and an end wall 11*d* erected at a side of the bottom wall 11*a* and extended in a direction orthogonal to the side walls 11*b* and 11*c*. A first locking portion 11*e* is provided at aside of the bottom wall 11*a* opposed to the side provided with the end wall 11*d*.

At an inner face of the side wall 11*c* on one side, there is provided a positioning projected portion 13 to be fitted to the recessed portion 80*a* of the DLT cassette 80 and the recessed portion 90*a* of the LTO cassette 90. Further, at an inner face of the end wall 11*d*, there is provided an auxiliary positioning projected portion 14 which is brought into a recessed portion (not illustrated) provided at a front end face of the DLT cassette 80 in the direction of inserting the cassette and is brought into contact with a front end face of the LTO cassette 90 in the direction of inserting the cassette.

The lid portion 15 is provided with a ceiling wall 15*a* having a shape and an area the same as those of the bottom wall 11*a* of the accommodating portion 11. A side of the ceiling wall 15*a* is connected to a front end (upper end) of the end wall lid of the accommodating portion 11 via the connecting portion 20. There is provided an end wall, not illustrated, at a side of the ceiling wall 15*a* opposed to the side connected to the connecting portion 20. The end wall is provided with a second locking portion (not illustrated) in correspondence with the first locking portion 11*e* of the accommodating portion 11. There are provided side walls 15*b* and 15*c* at a pair of sides of the ceiling wall 15*a* extended in-directions orthogonal to the end wall.

Further, there is no restriction in modes of the first locking portion lie of the accommodating portion 11 and the second locking portion of the lid portion 15 but there can be exemplified a constitution in which recesses and projections thereof are engaged with each other, a constitution of using a piece of Velcro™ or the like. It is preferable to constitute the first locking portion lie and the second locking portion such that the accommodating portion 11 and the lid portion 15 are capable of being provided with a plurality of engaging portions. For example, there can be constructed a constitution in which at least one of the first locking portion 11*e* and the second locking portion is provided with two or more of projected portions and recessed portions.

In this case, the connecting portion 20 is formed in a shape of a long strip constituting a long side by a side thereof along an upper end side of end wall 11*d* of the accommodating portion 11. The connecting portion 20 functions as a thin-walled hinge foldable at a plurality of positions thereof.

Figure 2:
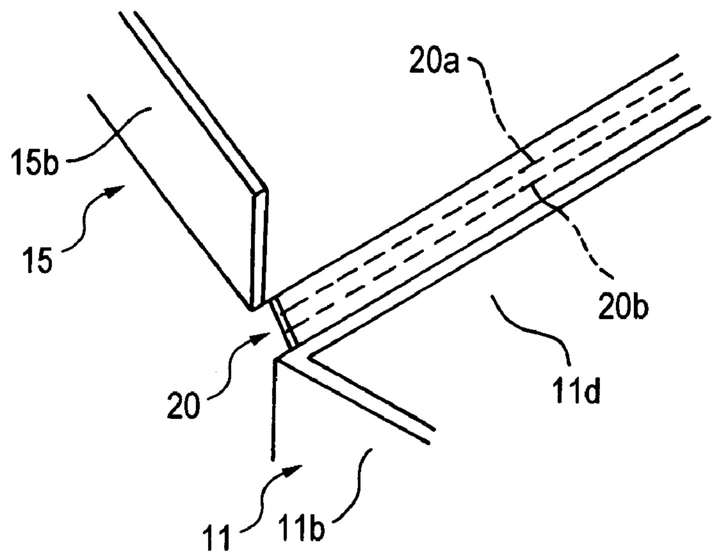
FIG. 2 is an enlarged view showing an essential portion of the first embodiment.

For example, as shown by FIG. 2, there can be formed two pieces of folding lines 20*a* and 20*b* extended in directions along the long side.

When the DLT cassette 80 is contained in the accommodating case 10 having the above-described constitution, the positioning projected portion 13 of the accommodating portion 11 is fitted to the recessed portion 80*a* of the DLT cassette 80 to thereby prevent the DLT cassette from playing at inside of the case. Meanwhile, the auxiliary positioning projected portion 14 of the accommodating portion 11 is not brought into contact with the surface of the DLT cassette 80. When the lid portion 15 is folded to the accommodating portion 11, a folding line is constituted at a portion of the connecting portion 20 on the side of the lid portion 15. That is, the lid portion 15 is folded by using the folding line 20*a* on the side of the lid portion 15 in the folding lines 20*a* and 20*b* shown in FIG. 2. Then, the ceiling wall 10*a* of the lid portion 15 is brought into contact with a ceiling face of the DLT cassette 80. In this way, by sandwiching the DLT cassette 80 by the ceiling wall 15*a* and the bottom wall 11*a*, the DLT cassette 80 is restricted from being moved in a height direction (Z direction) at inside of the case. The DLT cassette 80 is restricted from moving at inside of the case in X-Y plane by the positioning projected portion 13, the side walls 11*b* and 11*c* and the end wall 11*d* of the accommodating portion 11.

Meanwhile, when the LTO cassette 90 is contained in 10 the accommodating case 10, the positioning projected portion 13 of the accommodating portion 11 is fitted to the recessed portion 90*a* of the cassette 90 and the auxiliary positioning projected portion 14 of the accommodating portion 11 is brought into contact with a surface of the LTO cassette 90 to thereby prevent the LTO cassette from playing at inside of the case. Further, when the lid portion 15 is folded to the accommodating portion 11, a folding line is constituted at a portion of the connecting portion 20 on the side of the accommodating portion 11. That is, the lid portion 15 is folded by using the folding line 20*b* on the side of the accommodating portion 11 in the folding lines 20*a* and 20*b* shown in FIG. 2. Then, the ceiling wall 15*a* of the lid portion 15 is brought into contact with the ceiling face of the LTO cassette 90. In this way, the LTO cassette 90 is sandwiched by the ceiling wall 15*a* and the bottom wall 11*a* to thereby restrict the LTO cassette 90 from moving in the height direction (Z direction) at inside of the case. The LTO cassette 90 is restricted from moving at inside of the case in X-Y plane by the positioning projected portion 13, the side walls 11*b* and 11*c* and the auxiliary positioning projected portion 14 of the accommodating portion 11.

Figure 3:
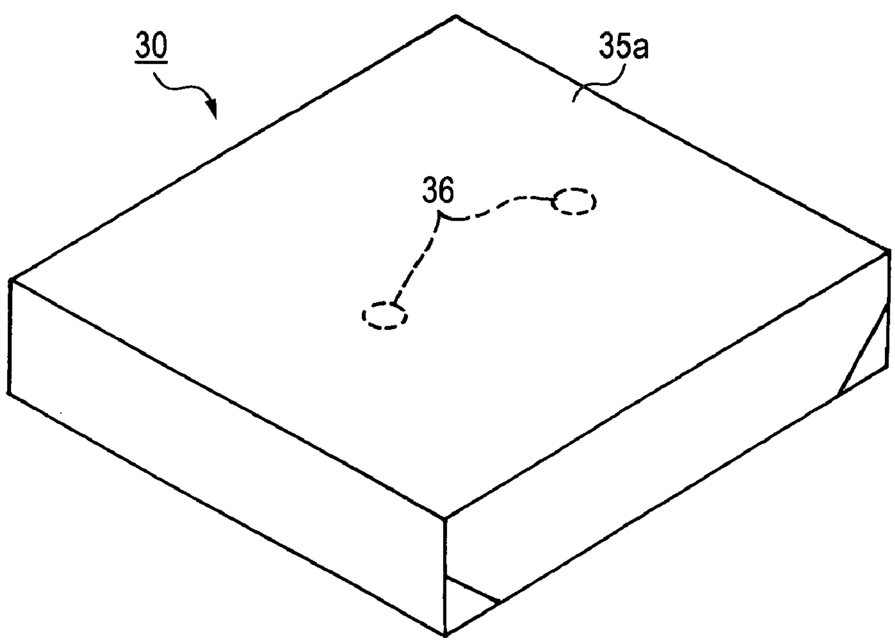
FIG. 3 is a perspective view showing a second embodiment of the invention.

According to a accommodating case 30 of a second embodiment shown in FIG. 3, there is provided an expandable and contractable support piece at an inner face of a ceiling wall 35*a*. When the DLT cassette is contained at inside of the accommodating case 30, the ceiling face of the DLT cassette is supported by the support piece 36 in a state of being pressed to contract. When the LTO cassette is contained at inside of the accommodating case 30, the ceiling face of the LTO cassette is supported by the support piece 36 in a state of being expanded.

A mode of the support piece 36 is not restricted but there can be exemplified a mode comprising an elastic member, or a mode using an expandable and contractable member of a spring or the like. A leaf spring or the like can also be used.

Further, the invention is not limited to the above-described embodiments but can be modified or changed pertinently.

For example, there can be constructed a constitution capable of accommodating three kinds or more of magnetic tape cassettes having different sizes.

Further, the invention is applicable also to a accommodating case of a magnetic cassette pivotably holding a pair of tape reels at inside of a cassette case.

While there has been described in connection with the preferred embodiments of the invention, it will be obvious to those skilled in the art -that various changes and modifications may be made therein without departing from the present invention, and it is aimed, therefore, to cover in the appended claim all such changes and modifications as fall within the true spirit and scope of the invention.

As has been explained above, according to a magnetic tape cassette case for accommodating a magnetic tape cassette of the invention, there can be provided the accommodating case for a magnetic tape capable of accommodating the magnetic tape cassettes having different sizes without play.

What is claimed is:

1. A tape cassette case capable of singularly accommodating a plurality of tape cassettes, said plurality of tape cassettes including first and second tape cassettes having different sizes, said case comprising:

an accommodating portion;

a lid portion;

a connecting portion for connecting the accommodating portion and the lid portion;

a movement preventing member provided on a side wall of the accommodating portion on a connecting portion side operable to prevent an accommodated tape cassette from moving inside of the case; and a protrusion provided on another side wall of said accommodating portion perpendicular to said side wall of of the accommodating portion on the connecting portion side, wherein said protrusion is located at a position where said protrusion is inserted into a recess provided on the first tape cassette when said first tape cassette is accommodated in the case and also where said protrusion is inserted into a recess provided on the second tape cassette when said second tape cassette is accommodated in the case.

2. The tape cassette case according to claim 1, wherein said lid portion includes an elastic member operable to adjust so as to contact each of the plurality of tape cassettes having different sizes in order to restrict movement of the plurality of tape cassettes once they are accommodated.

3. The tape cassette case according to claim 1, wherein said connecting portion comprises a folding line extending along a longitudinal direction thereof.

4. The tape cassette case according to claim 1, wherein said connecting portion includes two or more sections separated by one or more folding lines allowing a space between the lid portion and the accommodated tape cassette to be adjusted.

* * * * *